Patented Oct. 20, 1942

2,299,120

UNITED STATES PATENT OFFICE 2,299,120

PRODUCTION OF TITANIUM PIGMENTS

Benjamin Wilson Allan, Baltimore, Md., assignor to American Zirconium Corporation, Baltimore, Md., a corporation of Maryland No Drawing. Application November 21, 1938, Serial No. 241,513

13 Claims. (Cl. 106—300)

This invention relates to the production of titanium dioxide pigments, and more particularly to a titanium dioxide pigment which has a high resistance to discoloration especially when used in baking enamels.

One of the disadvantages of titanium pigments as heretofore prepared has been that they discolored, particularly when subjected to baking temperatures, although the discoloration takes place to some extent in air drying paints and enamels.

In making enamels it is desirable that the pigment be free from any grit or large pigment particles, and processes have been proposed and used for producing titanium pigments of the proper particle size. In Hanahan Patent No. 1,937,037 there is disclosed a process whereby the calcined titanium pigment in slurry form is deflocculated and a hydro-separation effected of the deflocculated material. The suspended material is then treated with an acid substance to flocculate the pigment. Acids may be used for the flocculation, but pigments so coagulated wet badly and are difficult to grind in paint vehicles. In practice, magnesium sulfate has been generally used as the flocculating agent.

In examining films of baked enamels using a titanium pigment prepared in accordance with the above, it was found that the discoloration was on the surface, and that upon the removal of this surface discoloration, a white film remained. Other investigations showed that this discoloration was, to some extent, brought about by sunlight when the above pigment was used in an air drying enamel. In all probability the magnesium soap formed when the pigment is ground in the vehicle migrates to the surface of the paint film. This soap film is polymerized and becomes darkened when subjected to high temperatures as in baking or on long exposure to actinic rays in the case of the air dried enamels.

In effecting the flocculation of the hydro-separated pigment with magnesium sulfate it has been found that a large quantity of this salt is adsorbed by the coagulated pigment particles. It has also been shown that this salt is responsible for the poor results obtained during baking. Ordinarily, the pigment is deflocculated at a pH of from 7.0 to 10.0 but it has been found that far less magnesium is adsorbed at a lower pH with an accompanying improvement in color when the pigment is made into an enamel and subjected to baking temperatures.

It has likewise been found that the use of zinc salts for flocculation gives equally as poor results as does magnesium. If barium, calcium, or strontium salts are used, however, it has been discovered that practically no discoloration is found, when the above tests are made. I attribute these results to the fact that titanium dioxide contains as much as .05% of sulfur as soluble sulfates which react with the barium, calcium and strontium salts to form insoluble sulfates which are non-reactive toward the acid constituents in the vehicles used for making the enamels. The magnesium and zinc, on the other hand, form soluble sulfates which are very reactive with these same acid constituents of the vehicle. This invention contemplates the use of such precipitating agents, which if adsorbed by the pigment will be in a highly insoluble, unreactive form. The invention likewise contemplates the use of coagulating salts which will not readily react with the paint vehicle to form soaps which are discolored by high temperatures for baking or actinic light rays.

It has been found that barium, calcium and strontium salts, preferably the acetates, may be satisfactorily used in the precipitation of the deflocculated titanium dioxide at pH as high as 10. This pigment has been found to be highly non-discoloring. The process allows variations in pH from 6.5 to 10 with but slight differences in properties of the product. This allows a pigment to be made having a high pH which permits ease of mixing and grinding and still unreactive during baking. Ordinarily about .1 to .3 grams of these salts is used per 100 grams of pigment in the slurry or preferably just sufficient to neutralize the charge on the titanium dioxide particles and cause coagulation.

Example I 6,000 grams of titanium dioxide prepared by hydrolysis from titanium sulfate solution was dispersed in 32 liters of water and sodium hydroxide added to raise the pH to 9.0. The deflocculated material was allowed to settle three hours and the upper 25 liters of slurry was syphoned off, thus removing the fine material from the coarse.

To this portion, free of coarse material, was added 153 cc. of a 5% solution of calcium acetate. The coagulated pigment was filtered and dried at 105° C. and ground. The pH of this pigment was 7.1. This pigment was used in making an alkyd resin baking enamel which upon baking at 300° F. for 1 hour showed practically no discoloration. An air dried enamel made from the same pigment also showed practically no yellowing on long exposure to sunlight.

Example II 6,000 grams of titanium dioxide (same as used above) was dispersed in 32 liters of water and sodium hydroxide added to raise the pH to 9.0. The deflocculated pigment was allowed to settle three hours and the upper 25 liters of the slurry was syphoned off. This material was coagulated with 213 cc. of a 5% solution of magnesium sulfate (a chemical equivalent to the amount of calcium acetate used in Example I). After filtering, drying and grinding, the pigment had a pH=7.2. When the pigment was made into an enamel and baked at 300° F. for 1 hour it gave a poor color and showed marked darkening of the film.

Example III 6,000 grams of titanium dioxide was slurried in water and the pH was adjusted to 7.5. This slurry was hydro-separated as in the above examples and then coagulated with 158 cc. of a 5% barium acetate solution. After filtration, drying, and grinding the pigment had a pH=6.6. The enamel containing this pigment showed practically no discoloration when baked.

Example IV

An equivalent amount (167 cc. of a 5% solution) of zinc sulfate was used in place of barium acetate of Example III. The pigment produced, discolored very badly when baked.

It is to be understood that the above examples are merely exemplary. Obviously variations may be resorted to within the scope of the appended claims without departing from the spirit of the invention. Any alkaline hydroxide including ammonium hydroxide may be used for deflocculating and other barium and calcium salts such as the chlorides and nitrates may be used for coagulating. The pH values may vary somewhat but will ordinarily be within the ranges indicated. The process is also applicable to composite titanium dioxide pigments, such as mixtures of titanium dioxide with sulfate extenders, lithopone, zinc oxide, etc.

Having described my invention, what is claimed is:

1. The process of treating calcined titanium dioxide to increase its resistance to discoloration, said process comprising deflocculating an aqueous slurry of calcined titanium dioxide containing small amount of soluble sulfate, effecting hydro-separation of the slurry, treating the fined particles of deflocculated titanium dioxide with a sufficient quantity of a water-soluble ionizable salt to discharge the negative sulfate ions of the titanium dioxide particles and thereby flocculate the same, said ionizable salt being that of a metal, the sulfate of which is insoluble in water, whereby said metal combines with said sulfate ions to form a water insoluble compound.

2. The process of treating calcined titanium dioxide to increase its resistance to discoloration, said process comprising deflocculating by means of an alkaline hydroxide selected from the class consisting of alkali metal and ammonium hydroxides an aqueous slurry of calcined titanium dioxide containing small amount of soluble sulfate, effecting hydro-separation of the slurry, treating the finer particles of deflocculated titanium dioxide with a sufficient quantity of a water-soluble ionizable salt to discharge the negative sulfate ions of the titanium dioxide particles and thereby flocculate the same, said ionizable salt being that of a metal, the sulfate of which is insoluble in water, whereby said metal combines with said sulfate ions to form a water-insoluble compound.

3. The process claimed in claim 1, wherein the metal of the ionizable salt is a member of the group consisting of calcium, barium and strontium.

4. The process claimed in claim 1, wherein the flocculation step is carried out at a pH from 6.5–10.

5. The process claimed in claim 1, wherein the ionizable salt is barium acetate.

6. The process claimed in claim 1, wherein the ionizable salt is calcium acetate.

7. The process of treating calcined titanium dioxide to increase its resistance to discoloration, said process comprising deflocculating an aqueous slurry of calcined titanium dioxde containing small amount of soluble sulfate, effecting hydro-separation of the slurry, separating the upper portion of the liquid containing the finer particles of deflocculated titanium dioxide from the lower portion of the liquid containing the coarser particles of deflocculated titanium dioxide and treating said upper portion of the liquid containing the finer particles of deflocculated titanium dioxide with a sufficient quantity of a water-soluble ionizable salt to discharge the negative sulfate ions of the titanium dioxide particles and thereby flocculate the same, said ionizable salt being that of a metal, the sulfate of which is insoluble in water, whereby said metal combines with said sulfate ions to form a water-insoluble compound.

8. The process of treating calcined titanium dioxide to increase its resistance to discoloration, said process comprising deflocculating by means of an alkaline hydroxide selected from the class consisting of alkali metal and ammonium hydroxides an aqueous slurry of calcined titanium dioxide containing small amount of soluble sulfate, effecting hydro-separation of the slurry, separating the upper portion of the liquid containing the finer particles of deflocculated titanium dioxide from the lower portion of the liquid containing the coarser particles of deflocculated titanium dioxide and treating said upper portion of the liquid containing the finer particles of deflocculated titanium dioxide with a sufficient quantity of a water-soluble ionizable salt to discharge the negative sulfate ions of the titanium dioxide particles and thereby flocculate the same, said ionizable salt being that of a metal of the group consisting of calcium, barium and strontium, the sulfate of which is insoluble in water, whereby said metal combines with said sulfate ions to form a water-insoluble compound.

9. The process claimed in claim 8, wherein the flocculation step is carried out at a pH from 6.5–10.

10. The process of treating calcined titanium dioxide to increase its resistance to discoloration when subjected to baking temperatures in enamels and the like, said process comprising deflocculating an aqueous slurry of calcined titanium dioxide containing small amount of soluble sulfate, effecting hydro-separation of the slurry, separating the upper portion of the liquid containing the finer particles of deflocculated titanium dioxide from the lower portion of the liquid containing the coarser particles of deflocculated titanium dioxide and treating said upper portion of the liquid containing the finer particles of deflocculated titanium dioxide with a sufficient quantity of a water-soluble ionizable salt to discharge the negative sulfate ions of the titanium dioxide particles and thereby flocculate the same, said ionizable salt being that of a metal of the group consisting of calcium, barium and strontium, the sulfate of which is insoluble in water, whereby said metal combines with said sulfate ions to form a water-insoluble compound.

11. The process claimed in claim 10, wherein the flocculation step is carried out at a pH from 6.5–10.

12. A method for improving the properties of titanium dioxide pigments which comprises intimately mixing particles of titanium dioxide pigment with an aqueous medium and a small amount of a dispersing agent to disperse the pigment particles, recovering the dispersed pigment particles from suspension by adding to the said suspension a small amount of a water soluble salt of an alkaline earth metal.

13. The process claimed in claim 1, wherein the ionizable salt is a member of the group consisting of barium acetate and calcium acetate.

BENJAMIN WILSON ALLAN.